(12) United States Patent
Maier et al.

(10) Patent No.: US 12,515,701 B2
(45) Date of Patent: Jan. 6, 2026

(54) PREDICTION APPARATUS FOR PREDICTING A PREDICTED TRAJECTORY FOR A SAFETY DRIVER ASSISTANT SYSTEM FOR A VEHICLE

(71) Applicant: Knorr-Bremse Systeme Fuer Nutzfahrzeuge GmbH, Munich (DE)

(72) Inventors: Oliver Maier, Stuttgart (DE); Andreas Nohl, Knittlingen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 338 days.

(21) Appl. No.: 17/713,720

(22) Filed: Apr. 5, 2022

(65) Prior Publication Data

US 2022/0348228 A1 Nov. 3, 2022

(30) Foreign Application Priority Data

Apr. 28, 2021 (EP) .................................... 21170943

(51) Int. Cl.
*B60W 60/00* (2020.01)
*B60W 30/095* (2012.01)
*B60W 30/12* (2020.01)
*B60W 30/14* (2006.01)
(Continued)

(52) U.S. Cl.
CPC .... *B60W 60/0015* (2020.02); *B60W 30/0953* (2013.01); *B60W 30/12* (2013.01); *B60W 30/14* (2013.01); *B60W 50/0097* (2013.01); *G08G 1/166* (2013.01)

(58) Field of Classification Search
CPC ......... B60W 60/0015; B60W 30/0953; B60W 30/12; B60W 30/14; B60W 50/0097; B60W 30/09; B60W 30/095; B60W 30/0956; G08G 1/166
See application file for complete search history.

(56) References Cited

U.S. PATENT DOCUMENTS

| | | | |
|---|---|---|---|
| 2018/0059670 A1* | 3/2018 | Nilsson | B60W 30/18163 |
| 2020/0070849 A1* | 3/2020 | Suzuki | B60W 50/087 |
| 2022/0048505 A1* | 2/2022 | Mills | G08G 1/163 |

(Continued)

FOREIGN PATENT DOCUMENTS

| | | |
|---|---|---|
| CN | 105378814 A | 3/2016 |
| CN | 110239531 A | 9/2019 |

(Continued)

OTHER PUBLICATIONS

Extended European Search Report issued Oct. 20, 2021 for European Patent Application No. 21170943.1.

*Primary Examiner* — Dylan M Katz
(74) *Attorney, Agent, or Firm* — NORTON ROSE FULBRIGHT US LLP (57) ABSTRACT

A prediction apparatus for predicting a predicted trajectory for a safety driver assistant system for a vehicle includes a receiving unit and a determination unit. The receiving unit is configured to receive at least one sensor information from at least one vehicle sensor of the vehicle and at least one trajectory information from at least one further driver assistant system of the vehicle. The determination unit is configured to determine the predicted trajectory for the vehicle using planned the trajectory information or the sensor information.

16 Claims, 2 Drawing Sheets

(51) Int. Cl.
  *B60W 50/00*   (2006.01)
  *G08G 1/16*    (2006.01)

(56)       References Cited

U.S. PATENT DOCUMENTS

| 2022/0135075 A1* | 5/2022  | Ng ......................... G06V 20/56 |
|---|---|---|
|                  |         | 701/301 |
| 2022/0289184 A1* | 9/2022  | Svensson .............. B60W 30/12 |
| 2022/0332318 A1* | 10/2022 | Sakayori ................. G05D 1/02 |

FOREIGN PATENT DOCUMENTS

| CN | 111547051    A  | 8/2020 |
|----|-----------------|--------|
| DE | 102008040077 A1 | 1/2010 |
| EP | 3036144    B1   | 6/2017 |
| EP | 3179463    A1   | 6/2017 |
| EP | 3291202    B1   | 4/2019 |
| EP | 3536575    A2   | 9/2019 |
| EP | 3699047    A1   | 8/2020 |
| WO | 2015024620 A1   | 2/2015 |

* cited by examiner

PREDICTION APPARATUS FOR PREDICTING A PREDICTED TRAJECTORY FOR A SAFETY DRIVER ASSISTANT SYSTEM FOR A VEHICLE

RELATED APPLICATION INFORMATION

The present application claims priority to and the benefit of European patent application no. 21170943.1, which was filed in Europe on Apr. 28, 2021, the disclosure which is incorporated herein by reference.

FIELD OF THE INVENTION

The present invention relates to a prediction apparatus for predicting a predicted trajectory for a safety driver assistant system for a vehicle, to a vehicle with said prediction apparatus, and to a method of controlling a prediction apparatus for a vehicle.

BACKGROUND INFORMATION

For driver assistant systems, the driver partially or mainly defines the future state of the ego vehicle. To make decisions, those systems consider one or more hypotheses of the predicted vehicle state for a certain prediction time period.

Patent document EP 3 291 202 B1 discusses a method of trajectory planning for maneuvers for an ego vehicle and also an Advanced Driver Assistance System arranged to perform the method as well as a vehicle comprising such an Advanced Driver Assistance System.

SUMMARY OF THE INVENTION

Against this background, it is the object of the present invention to provide an improved prediction apparatus for predicting a predicted trajectory for a safety driver assistant system for a vehicle, an improved vehicle with said prediction apparatus, and an improved method of controlling a prediction apparatus for a vehicle.

This object is achieved by a prediction apparatus for predicting a predicted trajectory for a safety driver assistant system for a vehicle, by a vehicle with said prediction apparatus, and by a method of controlling a prediction apparatus for a vehicle according to the main claims.

Advantageously, a prediction of a safety driver assistant system predicting a predicted trajectory for the vehicle to follow can be improved by using information from different driver assistant systems of the vehicle. The predicted trajectory afterwards can be used by the safety driver assistant system of the vehicle, for example to predict a possible collision of the vehicle with an object or further vehicle.

A prediction apparatus for predicting a predicted trajectory for a safety driver assistant system for a vehicle comprises a receiving unit and a determination unit. The receiving unit is configured to receive at least one sensor information from at least one vehicle sensor of the vehicle and at least one trajectory information from at least one further driver assistant system of the vehicle. The further driver assistant system may be located external to the safety driver assistant system or may be implemented into the driver assistant system. The determination unit is configured to determine the predicted trajectory for the vehicle using the trajectory information or the sensor information.

The vehicle may be a utility vehicle or commercial vehicle, for example a truck, bus or the like. The safety driver assistant system may be an active safety driver assistant system that may be used to either prevent from hazard situations and/or to reduce the harm caused by an inevitable collision of the vehicle. To achieve this, the safety driver assistant system may be configured to observe a vehicle environment, vehicle state and/or driver intention. Furthermore, the safety driver assistant system may be configured to analyze a situation and select a possible collision target, to decide on prevention strategies and/or to execute the desired prevention strategy. In order to select the target object properly, the active safety driver assistant system may be configured to take the future vehicle state into account. Therefore, the system may be configured to distinguish possible collision targets and other not relevant environmental objects like cars on an oncoming lane, parking cars or pedestrians on the sidewalk. The vehicle sensor may be part of the safety driver assistant system. The sensor information may represent a vehicle dynamic, a driver monitoring information and/or an observed environmental information. The trajectory information however may represent an observed environment and/or current vehicle state detected or analyzed by the further driver assistant system. According to an embodiment, the trajectory information may represent a trajectory planned by the further driver assistant system by using the observed environment and/or current vehicle state. In order to provide the trajectory information, the further driver assistant system may comprise a further vehicle sensor or use the aforementioned vehicle sensor, if the vehicle sensor isn't part of the safety driver assistant system. The determination unit may be configured to determine the predicted trajectory using either the trajectory information or the sensor information.

According to an embodiment, the receiving unit may be configured to receive the trajectory information from the further driver assistant system that is configured as a longitudinal and/or a lateral guidance system like for example an adaptive cruise control, a lane keeping assistant or a highway assistant of the vehicle. In an active state, such further driver assistant systems may be configured to continuously plan a trajectory for the vehicle, wherein the trajectory planned by the further driver assistant system may be more reliable than the future vehicle state determined by the safety driver assistant system, which may only be active in a hazard situation. Therefore, according to an embodiment, the determination unit may be configured to determine the predicted trajectory for the vehicle using the trajectory information if the further driver assistant system is activated and to determine the predicted trajectory for the vehicle using the sensor information if the further driver assistant system is deactivated. According to an embodiment, the determination unit may be configured to determine the predicted trajectory for the vehicle using only the trajectory information and/or wherein the sensor information is neglected, if the second driver assistant system is activated, and to determine the predicted trajectory for the vehicle using only the sensor information if the further driver assistant system is deactivated and no trajectory information is available. If the further driver assistant system is activated, the vehicle may be guided at least partly autonomously, wherein the vehicle may be guided by a driver, if the further driver assistant system is deactivated. According to an embodiment, the receiving unit may be configured to receive the trajectory information from the further driver assistant system being activated while the vehicle is guided autonomously.

According to an embodiment, the receiving unit may be configured to receive the trajectory information as a lateral planned trajectory from the further driver assistant system that is configures as a lateral guidance system like for example a lane keeping assistant of the vehicle or wherein the receiving unit is configured to receive the trajectory information as a longitudinal planned trajectory from the further driver assistant system that is configured as a longitudinal guidance system like for example an adaptive cruise control of the vehicle. Using also information of a further driver assistant system provides the advantage that information of said system can be further unitized, which is mostly already implemented in the vehicle and which is which is mature in its function. Thus, an easy computable and reliable trajectory information can be expected to be used in the present approach.

According to an embodiment, the receiving unit may be configured to receive at least a second trajectory information from at least a second further driver assistant system of the vehicle, wherein the determination unit is configured to determine the predicted trajectory for the vehicle using the second trajectory information. In this way, a combination of the trajectory information and the second trajectory information may be used to determine the predicted trajectory. According to another embodiment, only the second trajectory information may be used, if the further driver assistant system is deactivated. Or, only the trajectory information may be used, if the second further driver assistant system is deactivated.

According to an embodiment, the receiving unit may be configured to receive the second trajectory information from the second further driver assistant system that is configures as an adaptive cruise control, a lane keeping assistant or a highway assistant of the vehicle.

According to an embodiment, the receiving unit may be configured to receive the second trajectory information as a lateral planned trajectory from the second further driver assistant system, that is configured as a lateral guidance system like for example a lane keeping assistant of the vehicle or wherein the receiving unit is configured to receive the second trajectory information as a longitudinal planned trajectory from the second further driver assistant system that is configures as an longitudinal guiding system like for example a adaptive cruise control of the vehicle. According to an embodiment, a most reliable predicted trajectory may be determined by the determination unit determining the predicted trajectory using the lateral planned trajectory from the lateral guiding system and the longitudinal planned trajectory from the longitudinal guiding system.

According to an embodiment, the prediction apparatus may comprise an activation unit, wherein the activation unit is configured to activate a further prediction apparatus of the further driver assistant system, wherein the further prediction apparatus is configured to predict a planned trajectory of the vehicle and provide the planned trajectory as the trajectory information. In this way, the reliable trajectory information may be provided even if the further driver assistant system is deactivated.

According to an embodiment, the prediction apparatus may comprise a collision calculation unit, wherein the collision calculation unit is configured to calculate a collision probability value for a collision of the vehicle with an object or further vehicle using a planned trajectory based on the further driver assistant system. According to an embodiment, the collision calculation unit is configured to calculate the collision probability value for a collision of the vehicle with an object or further vehicle on the planned trajectory. Such a collision probability value can be used in order to avoid the possible collision. The collision calculation unit may enhance a safety of the vehicle.

According to an embodiment, the collision calculation unit may be configured to calculate a collision avoidance maneuver for adapting the trajectory using the collision probability value. By adapting the planned trajectory, the collision may advantageously be avoided.

A safety driver assistant system for a vehicle comprises an embodiment of an aforementioned prediction apparatus. The safety driver assistant system may furthermore comprise an observing unit for observing and/or providing the sensor information, an analyzing unit for analyzing situations and selecting possible collision targets, a deciding unit for deciding on prevention strategies and/or an executing unit for executing a desired prevention strategy. Advantageously, such a safety driver assistant system may use information from different driver assistant systems for predicting a most reliable predicted trajectory for the vehicle.

A vehicle comprises an embodiment of an aforementioned prediction apparatus. The vehicle may be a utility vehicle or commercial vehicle, for example a truck, bus or the like. The vehicle may be configured as an autonomous vehicle or a semi-autonomous vehicle. According to an embodiment, the vehicle may comprise a safety driver assistant system, a lateral and/or longitudinal guidance system like for example an adaptive cruise control and/or a lane keeping assistant and/or a highway assistant.

A method of controlling an aforementioned prediction apparatus comprises:

receiving at least one sensor information from at least one vehicle sensor of the vehicle and at least one trajectory information from at least one further driver assistant system of the vehicle; and determining a predicted trajectory for the vehicle using the trajectory information or the sensor information.

The method or the steps of the method may be executed using an aforementioned prediction apparatus.

What is also advantageous is a computer program product having program code which may be stored on a machine-readable carrier, such as semiconductor memory, hard disk or optical memory, and is used for performing the method one of the previously described embodiments, when the program product is executed on a computer or an apparatus.

Embodiments of the approach presented here shall be explained in greater detail in the subsequent description with reference to the figures, wherein:

In the following description of advantageous embodiments of the present invention, the same or similar reference numerals shall be used for the elements depicted in the various figures and acting in a similar way, wherein repeated description of these elements shall be omitted.

DETAILED DESCRIPTION

Figure 1:
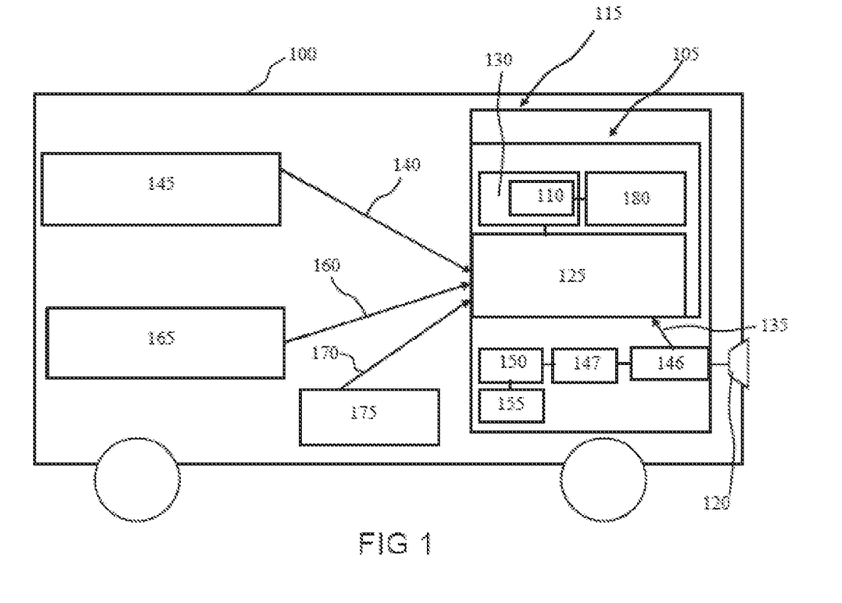
FIG. 1 shows a schematic illustration of a vehicle comprising a prediction apparatus according to an embodiment of the present invention for predicting a predicted trajectory for a safety driver assistant system of the vehicle.

FIG. 1 shows a schematic illustration of a vehicle 100 comprising a prediction apparatus 105 according to an embodiment of the present invention for predicting a predicted trajectory 110 for a safety driver assistant system 115 of the vehicle 100. The vehicle 100 is a utility vehicle or commercial vehicle and/or configured as an autonomous vehicle 100 or a semi-autonomous vehicle 100. According to this embodiment, the vehicle 100 comprises at least one vehicle sensor 120.

The prediction apparatus 105 for predicting the predicted trajectory 110 for the safety driver assistant system 115 of the vehicle 100 comprises a receiving unit 125 and a determination unit 130. The receiving unit 125 is configured to receive at least one sensor information 135 from at least the one vehicle sensor 120 of the vehicle 130 and at least one trajectory information 140 from at least one further driver assistant system 145 of the vehicle 100. According to an embodiment the further driver assistant system 145 is located external to the safety driver assistant system 115 or according to an another embodiment the further driver assistant system 145 is implemented into the safety driver assistant system 115. The determination unit 130 is configured to determine the predicted trajectory 110 for the vehicle 100 using the trajectory information 140 or the sensor information 135.

According to this embodiment, the prediction apparatus 105 is integrated or implemented into the safety driver assistant system 115 of the vehicle 100. The safety driver assistant system 115 is configured as an active safety driver assistant system that is configured to either prevent from hazard situations and/or to reduce the harm caused by an inevitable collision of the vehicle 100. To achieve this, according to this embodiment, the safety driver assistant system 115 comprises an observing unit 146 that is configured to observe a vehicle environment and/or vehicle state of the vehicle 100 and/or a driver intention and/or is configured to provide the vehicle environment and/or vehicle state and/or driver intention as the sensor information 135. Furthermore, according to this embodiment, the safety driver assistant system 115 comprises an analyzing unit 147 for analyzing situations and selecting possible collision targets, a deciding unit 150 for deciding on prevention strategies and/or an executing unit 155 for executing a desired prevention strategy. In order to select the target object properly, the active safety driver assistant system 115 is configured to take the future vehicle state into account. Therefore, the system 115 may be configured to distinguish possible collision targets and other not relevant environmental objects like cars on an oncoming lane, parking cars or pedestrians on the sidewalk. According to this embodiment, the vehicle sensor 120 is part of the safety driver assistant system 115 or the vehicle 100. According to this embodiment, the sensor information 135 represents a vehicle dynamic, a driver monitoring information and/or an observed environmental information. According to this embodiment, the trajectory information 140 however represents an observed environment and/or current vehicle state detected or analyzed by the further driver assistant system 145. According to an embodiment, the trajectory information 140 represents a predicted trajectory predicted by the further driver assistant system 145 by using the observed environment and/or current vehicle state. In order to provide the trajectory information 140, the further driver assistant system 115 comprises a further vehicle sensor or is configured to use the vehicle sensor 120, if the vehicle sensor 120 isn't part of the safety driver assistant system 115. The determination 130 unit is configured to determine the predicted trajectory 110 using either the trajectory information 140 or the sensor information 135.

According to this embodiment, the receiving unit 125 is configured to receive the trajectory information 140 from the further driver assistant system 145 that is configured as an adaptive cruise control, a lane keeping assistant or a highway assistant of the vehicle. In an active state, the further driver assistant system 145 is configured to continuously predict a trajectory for the vehicle 100, wherein the predicted trajectory predicted by the adaptive cruise control, lane keeping assistant or highway assistant is more reliable than the future vehicle state predicted by the safety driver assistant system 115, which is only active in a hazard situation. Therefore, according to this embodiment, the determination unit 130 is configured to determine the predicted trajectory 110 for the vehicle 100 using the trajectory information 140 if the further driver assistant system 145 is activated and to determine the predicted trajectory 110 for the vehicle 100 using the sensor information 135 if the further driver assistant system 145 is deactivated. According to this embodiment, the determination unit 130 is configured to determine the predicted trajectory 110 for the vehicle 100 using only the trajectory information 140 if the further driver assistant system 145 is activated and/or wherein the sensor information is neglected, and to determine the predicted trajectory 110 for the vehicle 100 using only the sensor information 135 if the further driver assistant system 145 is deactivated and no trajectory information is available. If the further driver assistant system 145 is activated, the vehicle 100 may be guided autonomously, wherein the vehicle 100 may be guided by the driver, if the further driver assistant system 145 is deactivated. According to an embodiment, the receiving unit 125 is configured to receive the trajectory information 140 from the further driver assistant system 145 being activated while the vehicle 100 is guided autonomously.

According to this embodiment, the receiving unit 125 is configured to receive the trajectory information 140 as a lateral planned trajectory from the further driver assistant system 145 that is configures as a lane keeping assistant of the vehicle 100 or wherein the receiving unit 125 is configured to receive the trajectory information 140 as a longitudinal planned trajectory from the further driver assistant system 145 that is configured as an adaptive cruise control of the vehicle 100.

According to this embodiment, the receiving unit 125 is configured to receive at least a second trajectory information 160 from at least a second further driver assistant system 165 of the vehicle 100, wherein the determination unit 130 is configured to determine the predicted trajectory 110 for the vehicle 100 using the second trajectory information 160. According to this embodiment, the receiving unit 125 is configured to receive at least a third trajectory information 170 from at least a third further driver assistant system 175 of the vehicle 100, wherein the determination unit 130 is configured to determine the predicted trajectory 110 for the vehicle 100 using the third trajectory information 170.

According to this embodiment, the receiving unit 125 is configured to receive the second trajectory information 160 from the second further driver assistant system 165 that is configures as an adaptive cruise control, a lane keeping assistant or a highway assistant of the vehicle 100. According to this embodiment, the receiving unit 125 is configured to receive the third trajectory information 170 from the third further driver assistant system 175 that is configures as an adaptive cruise control, a lane keeping assistant or a highway assistant of the vehicle 100.

According to this embodiment, the receiving unit 125 is configured to receive the second trajectory information 160 as a lateral planned trajectory from the second further driver assistant system 165, that is configured as a lane keeping assistant of the vehicle 100 or wherein the receiving unit is configured to receive the second trajectory information 160 as a longitudinal planned trajectory from the second further driver assistant system 165 that is configures as an adaptive cruise control of the vehicle 100. According to this embodiment, a most reliable predicted trajectory 110 is determined by the determination unit 130 using the lateral planned trajectory from the further driver assistant system 145 that is configured as a lane keeping assistant and the longitudinal planned trajectory from the second further driver assistant system 165, that is configured as an adaptive cruise control.

According to an embodiment, the prediction apparatus 105 comprises an activation unit, wherein the activation unit is configured to activate an further prediction apparatus of the further driver assistant system 145, wherein the further prediction apparatus is configured to predict a predicted trajectory of the vehicle 100 and provide the predicted trajectory as the trajectory information 140.

According to this embodiment, the prediction apparatus 105 furthermore comprises a collision calculation unit 180, wherein the collision calculation unit 180 is configured to calculate a collision probability value for a collision of the vehicle 100 with an object or further vehicle using a planned trajectory based on the further driver assistant system 145. According to an embodiment, the collision calculation unit 180 is configured to calculate the collision probability value for a collision of the vehicle 100 with an object or further vehicle on the predicted trajectory 110. According to an embodiment, the collision calculation unit 180 is configured to calculate a collision avoidance maneuver for adapting the predicted trajectory 110 using the collision probability value.

In other words, FIG. 1 shows an architecture of a prediction apparatus 105, which improves an ego path prediction for active safety driver assistant systems 115.

Active safety driver assistant systems 115 are used to either prevent from hazard situations or to reduce the harm caused by an inevitable collision. According to an embodiment, to achieve this the following steps are executed continuously:

Observe environment, vehicle state and driver intention
Analyze situation and select possible collision target
Decide on prevention strategies
Execute the desired strategy In order to select the target object properly, the active safety driver assistant system 115 takes the future vehicle state into account. Therefore, the system 115 can distinguish possible collision targets and other not relevant environmental objects like cars on the oncoming lane, parking cars or pedestrians on the sidewalk.

A problem with estimating the future vehicle state is that even if environmental data, vehicle dynamics and driver monitoring is considered, for larger prediction times, the estimation comes with a large uncertainty. This can for example lead to a wrong track selection, which can cause either false positives or false negatives.

Active safety driver assistant systems only intervene in hazard situations. Other further driver assistant systems 145, 165, 175 like adaptive cruise control, lane keeping assist and highway assist can be turned into active state and, while being in active state, continuously take over at least one part of the vehicle guidance. To ensure that the vehicle 100 is guided according to the given requirements, e. g. collision free, minimum jerk, reduction of fuel consumption, these systems 145, 165, 175, according to an embodiment, plan a trajectory, based on the observed environment and the current vehicle state. According to an embodiment, to guide the vehicle 100, the system calculates the actuator control values to execute the predicted trajectory 110. Although the predicted trajectory 110 avoids collisions while the vehicle 100 is guided, active safety driver assistant systems 115 are still active in the background. Because the guided vehicle 100 will follow the predicted trajectory 110, its uncertainty is smaller than the prediction based on environmental data, vehicle dynamics and driver monitoring. In this case, the predicted trajectory 110 can be used also for the active safety driver assistant system 115 in order to select the target object.

A possible version of this approach is:

If active, the lateral trajectory from the lane keep assist and the longitudinal trajectory from the adaptive cruise control driving function are used as the predicted ego vehicle trajectory/predicted trajectory 110.

Figure 2:
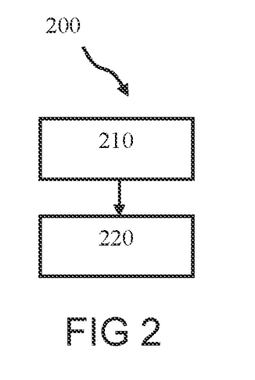
FIG. 2 shows a flowchart of a method of controlling a prediction apparatus according to an embodiment of the present invention.

FIG. 2 shows a flowchart of a method 200 of controlling a prediction apparatus according to an embodiment of the present invention. The method 200 is executable by the prediction apparatus as described with reference to FIG. 1 or a similar prediction apparatus.

The method 200 of controlling comprises a step 210 of receiving at least one sensor information from at least one vehicle sensor of the vehicle and at least one trajectory information from at least one further driver assistant system of the vehicle. Furthermore, the method 200 of controlling comprises a step 220 of determining the predicted trajectory for the vehicle using the trajectory information or the sensor information.

According to an embodiment, in the step 220 of determining the predicted trajectory for the vehicle, the predicted trajectory is determined by using only the trajectory information and/or wherein the sensor information is neglected, if in the step 210 of receiving a trajectory information is received. According to an embodiment, in the step 220 of determining the predicted trajectory for the vehicle, the predicted trajectory is determined by using only the sensor information, if in the step 210 of receiving no trajectory information is received.

According to an embodiment, in the step 220 of determining the predicted trajectory for the vehicle, the predicted trajectory is determined by using several trajectory information from several different further driver assistant systems and/or wherein the sensor information is neglected, if in the step 210 of receiving several trajectory information from several different further driver assistant systems are received.

THE REFERENCE NUMERAL LIST IS AS FOLLOWS 100 vehicle
105 prediction apparatus
110 predicted trajectory
115 safety driver assistant system
120 vehicle sensor
125 receiving unit
130 determination unit
135 sensor information
140 trajectory information
145 further driver assistant system
146 observing unit
147 analyzing unit
150 deciding unit
155 executing unit
160 second trajectory information
165 second further driver assistant system
170 third trajectory information 175 third further driver assistant system
180 collision calculation unit
200 method of controlling a prediction apparatus for a vehicle
210 step of receiving
220 step of determining

What is claimed is:

1. A prediction apparatus for predicting a predicted trajectory for a safety driver assistant system for a vehicle, comprising:
a non-transitory computer readable medium having a computer program, which is executable by a processor, comprising:
a program code arrangement having program code for predicting a predicted trajectory for a safety driver assistant system for a vehicle, by performing the following:
receiving, by the prediction apparatus, at least one sensor information from at least one vehicle sensor of the vehicle and at least one trajectory information from at least one further driver assistant system of the vehicle, wherein the prediction apparatus is part of the safety driver assistant system;
predicting, by the prediction apparatus, the predicted trajectory for the vehicle using the trajectory information; and
activating, by the prediction apparatus, a further prediction apparatus of the further driver assistant system, the further prediction apparatus, when activated, predicting a planned trajectory of the vehicle and providing the planned trajectory to the prediction apparatus as the trajectory information, wherein the prediction apparatus activates the further prediction apparatus when the further driver assistant system is in a deactivated state;
wherein the safety driver assistant system uses the predicted trajectory to control actuator controls of the vehicle,
wherein the vehicle is a utility vehicle or commercial vehicle and is configured as an autonomous vehicle or a semi-autonomous vehicle,
wherein the at least one further driver assistant system of the vehicle is located external to the safety driver assistant system,
wherein the safety driver assistant system is configured as an active safety driver assistant system,
wherein the safety driver assistant system includes an observing unit configured to observe: (a) a driver intention, and (b) a vehicle environment and/or a vehicle state of the vehicle, and
wherein the observing unit is further configured to provide: (a) the driver intention as the sensor information, and (b) the vehicle environment and/or the vehicle state as the sensor information;
wherein the safety driver assistant system is configured to intervene in control of the vehicle only in hazard situations, and wherein the further driver assistant system is an adaptive cruise control system and/or a lane keeping assist system and/or a highway assist system.

2. The prediction apparatus of claim 1, wherein the trajectory information is received from the further driver assistant system that is configured as a lateral and/or longitudinal guiding system of the vehicle.

3. The prediction apparatus of claim 2, wherein the trajectory information is received as a lateral planned trajectory from the further driver assistant system that is configured as a lane keeping assistant of the vehicle, or wherein the trajectory information is received as a longitudinal planned trajectory from the further driver assistant system that is configured as the adaptive cruise control of the vehicle.

4. The prediction apparatus of claim 1, wherein at least a second trajectory information is received from at least a second further driver assistant system of the vehicle, and wherein the predicted trajectory for the vehicle is determined using the second trajectory information.

5. The prediction apparatus of claim 4, wherein the second trajectory information is received from the second further driver assistant system, that is configured as a lateral and/or longitudinal guiding system of the vehicle.

6. The prediction apparatus of claim 5, wherein the second trajectory information is received as a lateral planned trajectory from the second further driver assistant system that is configured as a lane keeping assistant of the vehicle, or wherein the second trajectory information is received as a longitudinal planned trajectory from the second further driver assistant system that is configured as the adaptive cruise control of the vehicle.

7. The prediction apparatus of claim 1, wherein the trajectory information is received from the further driver assistant system being activated while the vehicle is guided autonomously.

8. The prediction apparatus of claim 1, wherein the predicted trajectory for the vehicle is determined using the trajectory information if the further driver assistant system is activated and to determine the predicted trajectory for the vehicle using the sensor information if the further driver assistant system is deactivated.

9. The prediction apparatus of claim 1, further comprising:
calculating a collision probability value for a collision of the vehicle with an object or further vehicle using a planned trajectory based on the further driver assistant system.

10. The prediction apparatus of claim 9, wherein a collision avoidance maneuver for adapting the predicted trajectory is calculated using the collision probability value.

11. The prediction apparatus of claim 1, wherein the safety driver assistant system includes an analyzing unit for analyzing situations and selecting possible collision targets, and further includes a deciding unit for deciding on prevention strategies and an executing unit for executing a desired prevention strategy.

12. A safety driver assistant system for a vehicle, comprising:
a prediction apparatus for predicting a predicted trajectory for the safety driver assistant system, including:
a non-transitory computer readable medium having a computer program, which is executable by a processor, including:
a program code arrangement having program code for predicting the predicted trajectory for a safety driver assistant system for a vehicle, by performing the following:
receiving, by the prediction apparatus, at least one sensor information from at least one vehicle sensor of the vehicle and at least one trajectory information from at least one further driver assistant system of the vehicle, wherein the prediction apparatus is part of the safety driver assistant system;

predicting, by the prediction apparatus the predicted trajectory for the vehicle using the trajectory information; and activating, by the prediction apparatus, a further prediction apparatus of the further driver assistant system, the further prediction apparatus, when activated, predicting a planned trajectory of the vehicle and providing the planned trajectory to the prediction apparatus as the trajectory information, wherein the prediction apparatus activates the further prediction apparatus when the further driver assistant system is in a deactivated state;

wherein the safety driver assistant system uses the predicted trajectory to control actuator controls of the vehicle, wherein the vehicle is a utility vehicle or commercial vehicle and is configured as an autonomous vehicle or a semi-autonomous vehicle, wherein the at least one further driver assistant system of the vehicle is located external to the safety driver assistant system, wherein the safety driver assistant system is configured as an active safety driver assistant system, wherein the safety driver assistant system includes an observing unit configured to observe: (a) a driver intention, and (b) a vehicle environment and/or a vehicle state of the vehicle, and wherein the observing unit is further configured to provide: (a) the driver intention as the sensor information, and (b) the vehicle environment and/or the vehicle state as the sensor information;

wherein the safety driver assistant system is configured to intervene in control of the vehicle only in hazard situations, and wherein the further driver assistant system is an adaptive cruise control system and/or a lane keeping assist system and/or a highway assist system.

13. A vehicle, comprising:

a prediction apparatus for predicting a predicted trajectory for a safety driver assistant system for the vehicle, including:

a non-transitory computer readable medium having a computer program, which is executable by a processor, including:

a program code arrangement having program code for predicting the predicted trajectory for a safety driver assistant system for a vehicle, by performing the following:

receiving, by the prediction apparatus, at least one sensor information from at least one vehicle sensor of the vehicle and at least one trajectory information from at least one further driver assistant system of the vehicle, wherein the prediction apparatus is part of the safety driver assistant system; and predicting, by the prediction apparatus, the predicted trajectory for the vehicle using the trajectory information; and activating, by the prediction apparatus, a further prediction apparatus of the further driver assistant system, the further prediction apparatus, when activated, predicting a planned trajectory of the vehicle and providing the planned trajectory to the prediction apparatus as the trajectory information, wherein the prediction apparatus activates the further prediction apparatus when the further driver assistant system is in a deactivated state;

wherein the safety driver assistant system uses the predicted trajectory to control actuator controls of the vehicle, and wherein the vehicle is a utility vehicle or commercial vehicle and is configured as an autonomous vehicle or a semi-autonomous vehicle, wherein the at least one further driver assistant system of the vehicle is located external to the safety driver assistant system, wherein the safety driver assistant system is configured as an active safety driver assistant system, wherein the safety driver assistant system includes an observing unit configured to observe: (a) a driver intention, and (b) a vehicle environment and/or a vehicle state of the vehicle, and wherein the observing unit is further configured to provide: (a) the driver intention as the sensor information, and (b) the vehicle environment and/or the vehicle state as the sensor information;

wherein the safety driver assistant system is configured to intervene in control of the vehicle only in hazard situations, and wherein the further driver assistant system is an adaptive cruise control system and/or a lane keeping assist system and/or a highway assist system.

14. A method of controlling a prediction apparatus for predicting a predicted trajectory for a safety driver assistant system for a vehicle, the method comprising:

receiving at least one sensor information from at least one vehicle sensor of the vehicle and at least one trajectory information from at least one further driver assistant system of the vehicle;

predicting, by a prediction apparatus of the safety driver assistant system a predicted trajectory for the vehicle using the trajectory information; and activating, by the prediction apparatus, a further prediction apparatus of the further driver assistant system, the further prediction apparatus, when activated, predicting a planned trajectory of the vehicle and providing the planned trajectory to the prediction apparatus as the trajectory information, wherein the prediction apparatus activates the further prediction apparatus when the further driver assistant system is in a deactivated state;

wherein the safety driver assistant system uses the predicted trajectory to control actuator controls of the vehicle, wherein the vehicle is a utility vehicle or commercial vehicle and is configured as an autonomous vehicle or a semi-autonomous vehicle, wherein the at least one further driver assistant system of the vehicle is located external to the safety driver assistant system, wherein the safety driver assistant system is configured as an active safety driver assistant system, wherein the safety driver assistant system includes an observing unit configured to observe: (a) a driver intention, and (b) a vehicle environment and/or a vehicle state of the vehicle, and wherein the observing unit is further configured to provide: (a) the driver intention as the sensor information, and (b) the vehicle environment and/or the vehicle state as the sensor information;

wherein the safety driver assistant system is configured to intervene in control of the vehicle only in hazard situations, and wherein the further driver assistant system is an adaptive cruise control system and/or a lane keeping assist system and/or a highway assist system.

15. A non-transitory computer readable medium having a computer program, which is executable by a processor, comprising:

a program code arrangement having program code for controlling a prediction apparatus for predicting a predicted trajectory for a safety driver assistant system for a vehicle, by performing the following:

receiving, by the prediction apparatus, at least one sensor information from at least one vehicle sensor of the vehicle and at least one trajectory information from at least one further driver assistant system of the vehicle, wherein the prediction apparatus is part of the safety driver assistant system;

predicting, by the prediction apparatus, a predicted trajectory for the vehicle using the trajectory information or the sensor information; and activating, by the prediction apparatus, a further prediction apparatus of the further driver assistant system, the further prediction apparatus, when activated, predicting a planned trajectory of the vehicle and providing the planned trajectory to the prediction apparatus as the trajectory information, wherein the prediction apparatus activates the further prediction apparatus when the further driver assistant system is in a deactivated state;

wherein the safety driver assistant system uses the predicted trajectory to control actuator controls of the vehicle, and wherein the vehicle is a utility vehicle or commercial vehicle and is configured as an autonomous vehicle or a semi-autonomous vehicle, wherein the at least one further driver assistant system of the vehicle is located external to the safety driver assistant system, wherein the safety driver assistant system is configured as an active safety driver assistant system, wherein the safety driver assistant system includes an observing unit configured to observe: (a) a driver intention, and (b) a vehicle environment and/or a vehicle state of the vehicle, and wherein the observing unit is further configured to provide: (a) the driver intention as the sensor information, and (b) the vehicle environment and/or the vehicle state as the sensor information;

wherein the safety driver assistant system is configured to intervene in control of the vehicle only in hazard situations, and wherein the further driver assistant system is an adaptive cruise control system and/or a lane keeping assist system and/or a highway assist system.

16. The computer readable medium of claim 15, wherein the trajectory information is received from the further driver assistant system that is configured as a lateral and/or longitudinal guiding system of the vehicle.

* * * * *